TABLE I – Average of the sanguine determinations
From left to right: before treatment,
after 3 months, and more than 3 months of treatment

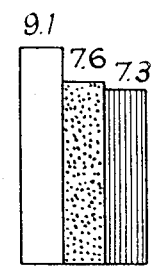

Total lipides
g/l
19 cases
FIG.1

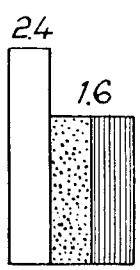

Triglycerides
g/l
13 cases
FIG.2

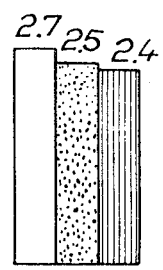

Cholesterol
g/l
27 cases
FIG.3

TABLE II – Average of the sanguine determinations
from left to right: before treatment,
after 3 months, and more than 3 months of treatment

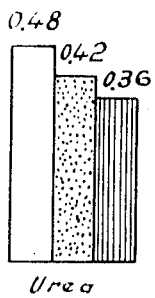

Urea
g/l
29 cases
FIG.4

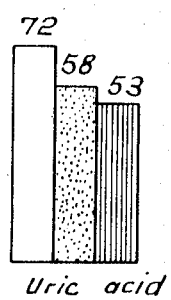

Uric acid
mg/l
60 cases
FIG.5

United States Patent Office 3,658,969
Patented Apr. 25, 1972

3,658,969
PHARMACEUTICAL COMPOSITIONS USEFUL IN CITRIC ACID THERAPY
Jeanne Renie, Born Vaille, Paris, France, assignor to Codex S.A., Fribourg, Switzerland
Continuation-in-part of application Ser. No. 605,600, Dec. 29, 1966. This application Nov. 14, 1969, Ser. No. 876,804
Int. Cl. A61k 27/00
U.S. Cl. 424—317          6 Claims

ABSTRACT OF THE DISCLOSURE

This invention relates to a pharmaceutical composition used for treating disorders in the metabolism known as "overload" diseases, as well as for treating diseases coming within the scope of conventional citric therapeutics, said composition comprising an equilibrium mixture of citric acid, monosodium citrate and monopotassium citrate, in a weight ratio of 1–1.3:2:2 of citric acid:monosodium citrate:monopotassium citrate, associated with a suitable pharmaceutical excipient.

---

This is a continuation-in-part of copending Ser. No. 605,600, filed Dec. 29, 1966 and now abandoned.

DETAILED DESCRIPTION

Citric acid and trisodium and tripotassium citrates have been used for a long time in human therapeutics, and their physiological and therapeutical effects are well known: biliary and intestinal stimulant effect, lipotropic effect, trophic action on the arterial wall, anticoagulant action on the blood, alkalinizing action on urine, etc.

However, up to the present time, it has only been possible to administer them orally in small doses, not exceeding 3 grams per day, since daily and continuous use of doses higher than 3 g. causes a certain toxicity which may bring about various disorders, including tetanus, hyperkaliemia, and alkalosis (irritability, nervosity, neuromuscular hyperexcitability).

Now, at these small doses, these products have no biochemical influence at the stage of cellular metabolism, no action on the disorders in the metabolism, particularly on the "overload" diseases (disorders caused by an excess of glucides, protides or lipides).

The applicant has made the surprising discovery that massive doses of citric ions may be orally and ocntinuously administered to man, which are higher than 3 g. per day, with a perfect digestive tolerance, absolute innocuity, without provoking any secondary disorder of the type described hereinabove, by utilising an equilibrium mixture of citric acid, monosodium citrate and monopotassium citrate (and not trisodium or tripotassium citrate) in a weight ratio of 1–1.3:2:2 and preferably of 1.3:2:2 respectively.

The preparation of the type according to the invention contains the following ingredients:

|  | G. |
|---|---|
| Citric acid | 1.3 |
| Monosodium citrate | 2 |
| Monopotassium citrate | 2 | and gives about 4 g. citric ions per dose.

Administered at the normal posology of 2 to 4 doses per day, it provides the massive dose of 8 g. to 16 g. citric ions per 24 hours.

The mechanism of the action of citric derivatives, in equilibrium mixture and massive dosages according to the invention, has not yet been entirely elucidated, but it appears that the mixture of the invention affects the cellular metabolism and, particularly, causes an auto-regulation of the metabolic equilibrium of the protides, glucides and lipides.

It is known that the metabolism of protides, glucides and lipides supplied by alimentary consumption is governed by the law of nitrogen balance, with preferential consumption of the protides and accumulation of lipide and glucide reserves, the excess of which is transformed into fats and, for the glucides, into glycogens in the liver and the muscles. Biochemical regulation of this balance is also known, namely at the level of the products of metabolic degradation of the aliments mentioned, in the Krebs or citric cycle.

In the Krebs cycle, citric acid interacts particularly with other metabolic products, such as pyruvic acid, oxaloacetic acid and acetic acid, according to a group of reactions which obey a cybernetic rule wherein the acids follow schemes of action and retroaction, in particular with elimination of acetic acid, which is produced in the metabolism of glucides and lipides. The Krebs cycle thus allows the role of citric acid in metabolism to be conjectured. However, because of the complex phenomena of the biochemical reactions involved, as indicated above, it is not possible to determine, from what is known from the Krebs cycle, the favourable concentrations of citric derivatives necessary to control the metabolic regulation of protides, glucides and lipides and, consequently, to obtain the therapeutic results observed within the scope of the present invention.

The administration of the equilibrium mixture of massive dosage citric derivatives of the invention reinforce of course the conventional activities of the citric therapeutics, but it also constitutes a deliberate therapeutic intervention in the Krebs cycle never postulated before and it thus opens the way to spectacular new therapeutic treatments of disorders in the metabolism.

The applicant is putting forward the hypothesis, which is in no way intended to limit the invention, that the administration to patients of massive doses of citric derivatives is indispensable in order that the citric ions, after having cleared the intestinal barrier with considerable wastage, may reach and pass through the cellular barrier then the mitochondrial membrane in a sufficient quantity to allow for an integration at the cellular metabolism stage and a favourable action on the disorders in the metabolism, in particular on the overload diseases.

This integration at the cellular metabolism stage must have for its effect an overactivation of the tricarboxylic Krebs cycle and therefore a favourable action on the disorders in the metabolism.

The mechanism and the hypothesis described hereinabove are confirmed by the clear improvements obtained in numerous patients having received the treatment by the mixture of citric derivatives according to the invention, these patients suffering from various disorders in the metabolism, known as "overload" diseases.

It is known in fact in the daily external contribution of food and drink, starting from carbohydrates, fats and proteins, that in the first stage, the digestion effects a strict selection; at the end of this, it is placed at the disposal of the organism of glucides, fatty acids and amino acids.

These three bodies will in their turn undergo a whole series of chemical, physical and biochemical transformations embodying the metabolism and terminating at the very level of the cell by the tricarboxylic Krebs cycle which at the same time releases the greatest source of energy available to the human body.

This cycle being terminated, there is harmoniously distributed in the blood circulation:

glucose (between 0.90 and 1.15 g./l.) coming from the glucides;

uric acid (between 40 and 50 mg./l.) and urea (between 0.25 and 0.40 g./l.) coming from the protides;
total lipides (about 6 g.),
cholesterol (between 2.20 and 2.80 g./l.), and
triglycerides (between 1.50 and 2 g.) coming from the fatty acids.

When, for one reason or another, each of these doses is increased, there is an overload; there are therefore three serious overload diseases:

(1) Diabetes or disease caused by an excess of glucides;
(2) Uric diathesis (under which may be classified gout, urolithiasis and certain hyperuricemic manifestations) or disease caused by an excess of protides;
(3) Atherosclerosis (as well as disorders playing an active role in the development of atherosclerosis, such as hypercholesterolemia, hypertriglyceridemia and hyperlipemia) or disease caused by an excess of lipides.

The present invention therefore has for its object a pharmaceutical composition used for treating disorders in the metabolism, known as overload diseases and also for treating diseases coming within the scope of conventional citric therapeutics, comprising an equilibrium mixture of citric acid, monosodium citrate and monopotassium citrate in the weight ratio of 1–1.3:2:2 and preferably of 1.3:2:2 respectively, associated with a suitable pharmaceutical excipient.

More particularly, said composition contains in the form of a dosage unit 1.3 g. citric acid, 2 g. monosodium citrate and 2 g. monopotassium citrate and a suitable pharmaceutical excipient.

This excipient may be advantageously constituted by vegetable essences such as a mixture of lemon essence, mandarin essence and orange essence, and by colourants such as tartrazine yellow, in non-toxic quantities, of the order of a few thousandths to a few hundredths of a gram, and mainly by sugar (about 10 g.).

This excipient may also contain an elective antispasmodic of the urinary channels, such as trimethoxybenzene, in a quantity of about 0.1 g.

The invention also has for its object a new process for the treatment of disorders in the metabolism, known as overload diseases and also for treating diseases coming within the scope of the conventional citric therapeutics, by continuous oral administration of massive doses of citric ions, greater than 3 g. per 24 hours, using the pharmaceutic composition according to the invention, preferably at a rate of 2 to 4 dosage units per 24 hours.

In the following example, a preparation is given in the form of the dosage unit according to the invention.

EXAMPLE

The following prepaartion was made and put into sachets:

| | G. |
|---|---|
| Citric acid | 1.3 |
| Monosodium citrate | 2 |
| Monopotassium citrate | 2 |
| Tartrazine yellow | 0.001 |
| Lemon essence | 0.04 |
| Orange essence | 0.04 |
| Mandarin essence | 0.009 |
| Sugar, sufficient quantity for a sachet measured at | 16.00 |

As a variant, 0.1 g. trimethoxybenzene, as elective antispasmodic of the urinary channels, may be added to this formula.

2 to 4 sachets of the above-mentioned formula are administered per day for a period of one to eleven months to various groups of patients.

The treatment was given to 76 patients (53 men and 23 women whose ages range between 38 and 83, and most of whom are aged from 51 to 60 years old), for a first series of clinical tests.

According to the nature of the causal affection, it is a question in 18 cases of urolithiasis, in 9 cases of gout without urinary lithiasis, in 28 cases of degenerative arthropathies with hyperuricemia, in 10 cases of sequels of viral hepaty in adults and in 11 cases of ischemic accidents of atherosclerosis with hyperlipemia.

Modalities of treatment

All the patients received 2 to 4 sachets per day of the preparation described hereinabove, or 8 to 16 grams of citric ions per 24 hours for a period of between 4 and 36 months.

Efforts were made to introduce no other variable during the treatment; in particular, no well-known hypouricemic, hyperuricosuric, hypolipemic or hypo-azotemic therapeutics has been associated; the patients were treated with an "ambulatory treatment" and were on a free diet.

Methods of titration

The titration of plasmatic uric acid was carried out according to the Praetorius and Poulsen technique (normal 50 to 55 mg./l. in man—from 40 to 48 mg./l. in woman).

The titration of sanguine urea was carried out by the technique with diacetylmonoxime (normal 19 to 32 mg./l).

The total cholesterol was dosed by the Delsal method.

The total lipides were determined by the Delsal technique, and the triglycerides by the Van Haendel and Zilversmit method; the following figures are considered abnormal:

| | G.p. 1000 |
|---|---|
| Total cholesterol | >2.60 |
| Total lipides | >7.50 |
| Triglycerides | ≥2 |

The glycemia was assessed by the technichon.

The blood levels shown in the tables constitute the average of the different results obtained in the patients, before treatment, during the first three months of treatment and, for a prolonged treatment, after 3 months.

RESULTS (1) Action on the lipemia, cholesterolemia and triglyceridemia (a) Lipemia.—The average of the lipemia is reduced in 19 subjects treated, from 9.10 g./l. before treatment to 7.60 g./l. during the first three months of treatment, or a reduction of 16%, and to 7.30 g./l. for a prolonged treatment of more than three months, or a reduction of 19%.

(b) Cholesterolemia.—The average cholesterolemia of 27 subjects treated passes from 2.70 g./l. before the institution of the therapy, to 2.50 g./l. then to 2.40 g./l. for a treatment which is shorter then longer, respectively, than three months, or a reduction percentage of 7 and 10%.

(c) The average triglyceridemia, assessed from 13 observations, is reduced within the same periods of time from 2.4 g./l. to 1.66 then 1.65 g./l. or a reduction percentage of 31% equivalent for the two periods (Table I of the drawing).

(2) Action on the sanguine urea

The average level of sanguine urea assessed in 29 subjects is reduced from 0.45 g./l. to 0.41 then 0.36 g./l. for a prolonged treatment of more than three months, or a reduction percentage of 14% and 24% respectively.

(3) Action on uricemia

The average of uricemia in 60 patients passes from 72 mg./l. to 58 then 52 mg./l., or a reduction percentage of 19% for a treatment of less than three months and 27% for a treatment pursued for more than three months (Table II of the drawing).

(4) Glycemia

The average level of the glycemia determined from 18 observations is reduced from 1.05 to 0.95 g./l. after a treatment of more than 3 months.

Moreover, the statistical study by the $t$ test of the previously reported results, outside of the study of the glycemia, confirms the significance of the variations observed ($\alpha = 0.05$ is the maximum threshold admissible for the differences to be significant) (Table III).

TOLERANCE

The tolerance of the product has always been perfect in the 76 observations.

TABLE III

[Biological changes observed in the man, under the influence of a prolonged treatment]

| Blood levels | Duration of the treatment— | |
|---|---|---|
| | Less than 3 months [1] | More than 3 months [1] |
| Total lipides, percent | 16 | 19 |
| 19 cases | $0.001 < \alpha < 0.01$ | $0.001 < \alpha < 0.01$ |
| Triglycerides, percent | 31 | 31 |
| 13 cases | $\alpha < 0.01$ | $\alpha < 0.01$ |
| Cholesterol, percent | 7 | 10 |
| 27 cases | $0.01 < \alpha < 0.02$ | $0.01 < \alpha < 0.02$ |
| Urea, percent | 14 | 24 |
| 29 cases | $0.02 < \alpha < 0.05$ | $0.001 < \alpha < 0.01$ |
| Uric acid, percent | 19 | 27 |
| 60 cases | $\alpha < 0.001$ | $\alpha < 0.001$ |

[1] Average reduction percentage $\alpha$ threshold.

In conclusion, an association of citric acid and monosodium and monopotassium citrates in forced doses (8 to 16 g. of citric ions per 24 hours) administered to patients having an urolithiasis, for the sole purpose of medicinal chemolysis, has shown extensive therapeutic properties which have led to the experimentation being extended, then the variations induced by the treatment of certain essential sanguine constituents to be studied.

The drug used has in fact metabolic activities, which are noteworthy in the diversity of the metabolisms in question, determining a significant reduction in the sanguine amounts of the total lipides, cholesterol, triglycerides, urea and uric acid.

The effect of the drug lasts for as long as it is administered and, except for triglyceridemia, the prolongation of the treatment beyond three months further increases the quality of the results observed.

For a second series of clinical tests, the product was administered to 30 patents, viz 21 men and 9 women, aged from 38 to 71 years (average age: 59 years). The affections having motivated the prescription are divided as follows:

Vascular complications of atherosclerosis, accompanied by:

a plasmatic dyslipemia in 9 cases,
a hyperuricemia in 3 cases,
two associated biological anomalies in 7 cases, or 19 patients examined in this group and presenting:

an arteritis caused by excess in the lower limbs: 6 cases
clinically patient coronary insufficiently: 7 cases
a cerebrally localised degenerative arteritis: 6 cases
articular gout with hyperuricemia: 4 cases
plethoric diabetes with plasmatic dyslipemia: 5 cases
sequels of viral hepatitis: 2 cases

POSOLOGY

The dose administered daily was uniform, or 3 sachets, bringing a total of 12 grams of citric ions.

The duration of treatment varied from 5 to 10 weeks.

RESULTS

They are to be envisaged successively in the different groups of patients studied.

(A) Vascular complications of the atherosclerosis (19 cases)

(1) Accompanied by a plasmatic dyslipemia: 9 cases.

The amount of the total esterified fatty acids varied between 32 and 58 meq. per litre, with an average of 45 meq. percent (normal rate $\leq 15$ meq. percent).

In all cases, there was a hypertriglyceridemia, the serum administered before eating nevertheless remaining perfectly clear. The amounts measured ranged between 1.80 g. and 3.50 g. percent (normal values 1.50%, Van Handel and Zilversmit method), the average being 2.65%.

In 5 cases out of 9, there was a hyperchloesterolemia, the amounts ranging between 3 g. and 3.70 g. percent (normal value $\leq 2.40$ g. percent), the average measuring 3.27 g. percent.

After treatment by the product (average duration: 7½ weeks), a reduction is recorded in the amount of the total esterified fatty acids in all cases figuring on average 19 meq., this corresponding to a reduction of 42% of the initial average value.

For the duration of the treatment, the patients were subjected to the standard food diet prescribed by the hospital, without any particular restriction in the lipide or hydrocarbon ration.

This first result is the consequence of a drop in the rate of the plasmatic triglycerides which was noted in every case.

This reduction is 1.80 g. on average, or 41.5% of the initial average rate.

The cholesterolemia existing to a high degree in 5 patients was significantly reduced and the rates, measured initially at 3.27 g., 67 percent, were brought respectively to 2.31 g., 259 percent, or a reduction averaging 28.5%.

The following is a particularly significant observation on the effect of the product on plasmatic dyslipemia of persons suffering from atherosclerosis.

OBSERVATION

Man of 61 years, suffering for 5 years from angor pectoris caused by overstrain.

amount of total lipides: 46 meq. percent.
triglyceridemia: 2.20%.
chloesterolemia: 3.25%.

Treatment by the product at a rate of 3 sachets per day, for 8 weeks.

| Control balance | 15th day | 30th day | 55th day |
|---|---|---|---|
| Total esterified fatty acids | 41 | 39 | 24 |
| Triglycerides | 1.85 | 1.65 | 1.30 |
| Cholesterol | 3 | 2.90 | 3.10 |

(2) Accompanied by a plasmatic dyslipemia and a hyperuricemia: 7 cases.

The amount of the total esterified fatty acids varied, in this particular group, between 25 and 61 meq. percent (average 39 meq. percent).

The hypertriglyceridemia existed in all cases, the amounts measured ranging between 1.60 g. and 3.80 g. percent, with an average of 2.40 g. percent.

A hypercholesterolemia was only noted in 3 cases out of 7, averaging 2.96 g. percent.

The product administered for an average duration of 6 weeks, gave the following results:

The amount of the total esterified fatty acids was significantly influenced in 4 cases out of 7, the reduction being at an average of 15 meq., this corresponding to a reduction of 38% of the initial average value.

The amount of the plasmatic triglycerides was clearly reduced in 3 cases out of 7, the reduction being averaged at 15 meq., this corresponding to a reduction of 38% of the intial average value.

For the cholesterolemia, the amount was reduced in 7 weeks of treatment from 3.65 g. to 2.14 g. percent.

The uricemia, figured at the beginning between 71 and 112 mg. percent, with an average value of 87 mg. percent (uricase method) was brought, in all cases, to below 60 mg. percent (average reduction of 37 mg., or 42% of the initial amount).

(3) Accompanied by an isolated hyperuricema: 3 cases.

None of these patients had gout or had a family tendency to suffer from gout. Moreover, the relative frequency of hyperuricemia is known in the person suffering from atherosclerosis.

The amount of uricemia was between 76 and 103 mg. percent (uricase method) with an average of 82 mg. percent.

The product, administered for 7 weeks on average, has made it possible to bring this amount to below the normal top limit (60%) in 3 patients, the reduction being on average 28 mg. (drop of 34% from the initial average amount).

All the results obtained in the group of patients with vascular complications of the atherosclerosis are shown in attached Table IV.

four, the reduction in the amount being on average 40% of the initial value.

The hyperazotemia, recorded in one case, was reduced to 0.61%.

No substantial modification in the number and volume of the tophi was recorded. Similarly, the radiological signs were not influenced by the treatment.

(C) Plethoric diabetes with plasmatic dyslipemia

This category comprises 5 patients having diabetes mellitus which has been developing for 4 to 10 years, accompanied in two cases by degenerative vascular complications (1 diabetic retinopathy: 1 arteritis of the lower limbs yith radiologically visible arterial calcifications).

A plasmatic lipidic balance was made after equilibration of the diabetes (insulin-delay in 3 cases, sulphamide in 2 cases).

The amount of total esterified fatty acids, measured before the patient had eaten, varied between 26 and 41 meq. percent (average amount: 36 meq. percent).

In the 5 observations, a moderate hypertriglyceridemia was noted, measuring on average 2.60 g. percent (amount ranging from 2.15 g. and 3.10 g. percent).

In no observation did the cholesterolemia exceed

TABLE IV

| | Number of cases treated | Average duration, weeks | Total esterified fatty acids | | Triglyceridemia | | Cholesterolemia | | Uricemia | |
|---|---|---|---|---|---|---|---|---|---|---|
| | | | Positive result | Average percent | Positive result | Average percent | Positive result | Average percent | positive result | Average percent |
| Isolated plasmatic dylipemia | 9 | 7.5 | 9 | 42 | 9 | 41.5 | 2/5 | 28.5 | | |
| Plasmatic dylipemia plus hyperuricemia | 7 | 6 | 4/7 | 38 | 3/7 | 33 | 1/3 | 41 | 7 | 42 |
| Isolated hyperuricemia | 3 | 7 | | | | | | | 3 | 34 |

(B) Articular gout

This particular group was composed of 4 men, having a tophaceous gout with chronic gouty arthropathies, localised in particular at the level of the metatarsophalangeal joint of the first toe, associated in two cases with an arthropathy of the knees.

In all cases there were numerous tophi: in the toes, fingers of the hand, auricle.

Two of these patients underwent no particular treatment for a number of months and had a sub-acute articular evolutive outbreak at the level of the joint of the first toe. The other two were subject for 2 to 3 years to maintenance treatment by colchicine (1 to 2 mg. per day) and suffered no functional disorder.

In all cases there were specific radiological signs of gouty arthropathy. One of the patients had a moderate hyperazotemia at 0.76 g. percent without any signs of urinary infection.

The uricemia was established at the beginning at an average of 89 mg. percent, the values varying between 72 and 131 mg. percent.

The patients were treated with the product for an average duration of 8 weeks.

From the clinical point of view, a clear sedation of the pains and the articular inflammatory signs was obtained in the two patients where they existed without there being any need to add colchicine or anti-inflammatory medication. The therapeutic effect was noticed from the end of the second week of treatment and continued regularly.

From the biological point of view, the uricemia was brought to below 60 mg. percent in three cases out of 2.30%. Its amount was not checked during and at the end of treatment.

The product was administered, in the usual dose, for an average duration of 7 weeks.

The amount of total esterified fatty acids was signifiicantly reduced in 3 cases, its average value being 17 meq. percent at the end of the cure (reduction figured on average at around 53% of the initial amount).

In three patients, the triglyceridemia was reduced in all cases to an average value of 1.40 g. percent, or a reduction of 46% of the initial amount.

Table V attached summarizes the results obtained in these last two categories of subjects.

TABLE V.—TOPHACEOUS GOUT—DIABETES

| | Number of cases treated | Average duration, weeks | Esterfield fatty acids | | Triglycerides | | Uricemia | |
|---|---|---|---|---|---|---|---|---|
| | | | Positive result | Average percent | Positive result | Average percent | Positive result | Average percent |
| Gout | 4 | 8 | | | | | 3/4 | 40 |
| Diabetes | 5 | 7 | 3/5 | 53 | 3/5 | 46 | | |

(D) Sequels of viral hepatitis

Here, there were two patients, aged 38 and 41 years, cured from an epidemic viral hepatite for 6 months and 1 year respectively.

They noticed a functional symptomatology, caused by pains in the right hypocondria, intermittent nausea and in particular persistent lack of appetite. There was a persistent weight deficit of 6 to 8 kg., with the maintenance of a notable physical asthenia.

In both cases, the hepatic biological balance proved normal.

The product was prescribed on its own for 5 weeks.

As a whole, the effect was beneficial with regression of the pains, clear return of the appetite and especially a weight increase of 3 kg. in the first case and 4.500 kg. in the second. A hepatic biological control balance showed the same absence of anomaly.

In conclusion, an examination of the results obtained confirms the effects of the product on the disorders in the lipidic and protidic metabolisms, on dyspurinia and on cellular metabolism.

The dyslipemic syndrome of those patients suffering from atherosclerosis was clearly improved by the treatment. The hypertiglyceridemia was particularly influenced. Present in the 16 observations, it was significantly reduced in 12 patients, or in 75% of the cases, the reduction varying on average from 33 to 41.5% of the initial value. The effect obtained on the hypercholesterolemia, present in 8 patients, was qualitatively appreciable (reduction of 28.5% to 41% of the initial total).

Perfectly superposable biological results were obtained in elderly diabetics having an excess of plasmatic lipides; moreover, it is known that this excess is completely comparable with that observed in patients suffering from atherosclerosis. In this particular group, the hypertriglyceridemia was reduced on average by 46% by a treatment prescribed for 7 weeks.

The hypouricemial effect of the medication appeared particularly appreciable. Present in 11 patients, the hyperuricemia was totally reduced in 10 observations, or in 90% of the cases. In two gouty patients, the products proved to be clinically endowed with anti-inflammatory properties. It is in this same group of patients that a moderate hyperazotemia, probably in relation with a process of chronic glomerulonephritis, was partially corrected.

The significant improvement of the general state obtained in two patients having sequels of viral hepatitis, shows the undeniably anabolising effect of the medication.

The posology of 3 sachets per day seemed perfectly suitable for all the cases treated. No manifestation of intolerance was observed.

What is claimed is:

1. A method of treating disorders in humans characterized by an imbalance in the blood of the protide-glucide-lipide metabolic equilibrium which comprises orally administering an equilibrium mixture of citric acid, monosodium citrate and monopotassium citrate in a weight ratio of 1 to 1.3 parts of citric acid to 2 parts of monosodium citrate to 2 parts of monopotassium citrate, said equilibrium mixture being administered in amounts sufficient to supply a daily dosage of from more than 3 grams to 16 grams of citric ion.

2. In the treatment of conditions in humans in which citric acid therapy is indicated, the improvement consisting of orally administering an equilibrium mixture of citric acid, monosodium citrate and monopotassium citrate in a weight ratio of 1 to 1.3 parts of citric acid to 2 parts of monosodium citrate to 2 parts of monopotassium citrate, and equilibrium mixture being administered in amounts sufficient to supply a daily dosage of from more than 3 grams to 16 grams of citric ion.

3. A pharmaceutical composition for use in citric acid therapy comprising in a dosage unit form suitable for oral administration, an equilibrium mixture of citric acid, monosodium citrate and monopotassium citrate in a ratio of 1 to 1.3 parts of citric acid, to 2 parts of monosodium citrate to 2 parts of monopotassium citrate, said equilibrium mixture being present in said composition in an amount sufficient to provide upon daily administration, a total dosage of citrate ion of from more than 3 grams to 16 grams, and a pharmaceutically acceptable excipient.

4. A composition according to claim 3 containing 1.3 parts of citric acid.

5. A composition according to claim 3 wherein the pharmaceutically acceptable excipient includes sugar and at least one citrus essence.

6. A composition according to claim 4 wherein the pharmaceutically acceptable excipient includes about 0.001 part of tartrazine yellow, about 0.04 part of essence of lemon, about 0.04 part of essence of orange, about 0.009 part of essence of mandarin and about 10 parts of sugar.

References Cited

Matouschek et al., "Chem. Abstracts" vol. 69 (1968) p. 95023w.

Grande et al., "Chem. Abstracts" vol. 61 (1964) p. 12407c.

U.S. Pharmacopoeia, 13th ed. 1947, pp. 288, 365.

ALBERT T. MEYERS, Primary Examiner

V. D. TURNER, Assistant Examiner